(12) United States Patent
Gordon

(10) Patent No.: US 10,383,320 B2
(45) Date of Patent: Aug. 20, 2019

(54) FISHING LINE RINSE APPARATUS

(71) Applicant: Robert Gordon, San Diego, CA (US)

(72) Inventor: Robert Gordon, San Diego, CA (US)

(*) Notice: Subject to any disclaimer, the term of this patent is extended or adjusted under 35 U.S.C. 154(b) by 198 days.

(21) Appl. No.: 15/702,691

(22) Filed: Sep. 12, 2017

(65) Prior Publication Data
US 2019/0075771 A1 Mar. 14, 2019

(51) Int. Cl.
*A01K 97/00* (2006.01)
*A01K 89/015* (2006.01)
*A01K 89/00* (2006.01)

(52) U.S. Cl.
CPC ...... *A01K 89/01912* (2015.05); *A01K 89/003* (2013.01); *A01K 89/01925* (2015.05); *A01K 97/00* (2013.01)

(58) Field of Classification Search
CPC ...... A01K 13/001; A01K 91/00; A01K 91/02; A01K 91/06; A01K 97/00; A01K 97/06; A01K 97/16; A01K 97/02; A01K 97/05; A01K 99/00; A01K 89/00; A01K 89/015; A01K 89/017; A01K 89/0183; A01K 89/01912; A01K 89/019125; A01K 89/01913; A01K 89/0192; A01K 89/01925; A01K 89/193; A01K 89/01931; A01K 89/02; A01K 89/045; A01K 89/05; A01K 89/051
See application file for complete search history.

(56) References Cited

U.S. PATENT DOCUMENTS

| 2,040,567 | A | | 5/1936 | Rowe | |
|---|---|---|---|---|---|
| 2,592,143 | A | * | 4/1952 | Holtz | A01K 97/16 242/375.1 |
| 2,607,360 | A | * | 8/1952 | Young | A01K 89/00 134/122 R |
| 2,643,660 | A | | 6/1953 | Buchholz | |
| 3,598,334 | A | * | 8/1971 | Fleischer | A01K 89/01912 242/277 |
| 4,344,587 | A | * | 8/1982 | Hildreth | A01K 89/017 192/216 |
| 4,896,451 | A | * | 1/1990 | K'o | A01K 97/10 43/26.1 |
| 4,908,972 | A | * | 3/1990 | Stamer | A01K 91/18 43/27.4 |
| 5,725,172 | A | * | 3/1998 | Koehler | A01K 89/00 242/395 |
| 5,918,407 | A | * | 7/1999 | Sebestyen | A01K 91/08 43/27.4 |

(Continued)

*Primary Examiner* — Kathleen I Alker

(57) ABSTRACT

A fishing line rinse apparatus having a bucket with a drain spout. A perforated spool with a level wind is disposed on a shaft with a first quick-connector. A drive housing has a base with a pair of pulleys, and a hollow vertical column. A drive disposed within the hollow vertical column of the drive housing has a horizontal drive shaft, a differential, and a vertical drive shaft, wherein the horizontal drive shaft has a second quick-connector that engages the first quick-connector. The vertical drive shaft is selectively engageable with a drill, allowing a drill outside the bucket to spin the spool submerged in water in the bucket to wind and unwind the fishing line, thus rinsing the fishing line and transferring it from a rod to the spool and vice versa. A brake with a thumb screw is disposed on the spool to apply pressure while rewinding the line.

2 Claims, 5 Drawing Sheets

(56) References Cited

U.S. PATENT DOCUMENTS

| | | | | |
|---|---|---|---|---|
| 6,260,785 B1* | 7/2001 | Prais | ............... | A01K 89/003 |
| | | | | 242/390.8 |
| 9,693,545 B1* | 7/2017 | McIntyre | ............... | A01K 97/16 |
| 2004/0035973 A1* | 2/2004 | Henrion | ............... | A01K 89/003 |
| | | | | 242/390.8 |
| 2006/0086381 A1* | 4/2006 | Bardini | ............... | A01K 89/003 |
| | | | | 134/144 |
| 2006/0237565 A1* | 10/2006 | Barker | ............... | A01K 89/0114 |
| | | | | 242/229 |

* cited by examiner

FISHING LINE RINSE APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of fishing line rinse systems are known in the prior art. Fishing line such as Braid and Spectra line is very costly, and, when used in the ocean, can deteriorate quickly. Debris in the line can interfere with casting performance, and salt can transfer from the line onto rod and reel components and cause corrosion. What is needed, and what the present fishing line rinse apparatus provides, is a means of rinsing fishing line while transferring it to a spool independent of the fishing rod and reel for clean and easy storage. What is also needed is an apparatus that is portable and can be powered by any standard drill, rather than one that requires its own electronic components and power source.

FIELD OF THE INVENTION

The present invention relates to fishing equipment, and more particularly, to a fishing line rinse apparatus.

SUMMARY OF THE INVENTION

The general purpose of the present fishing line rinse apparatus, described subsequently in greater detail, is to provide a fishing line rinse apparatus that has many novel features that result in a fishing line rinse apparatus that is not anticipated, rendered obvious, suggested, or even implied by prior art, either alone or in combination thereof.

To accomplish this, the present fishing line rinse apparatus includes a bucket having an inside, an open top, and a bottom. A drain spout is disposed on the bucket proximal the bottom. Disposed within the inside of the bucket there is a spool having a pair of flanges and a centerline hole disposed along a central axis. The spool is significantly perforated or made of a spider web design in order to minimize water resistance and maximize the flow of water. A level wind is disposed on the spool between the pair of flanges. The level wind has a slidable eyelet that configured to receive a fishing line and to slide back and forth along the spool as it winds the fishing line, thus organizing the fishing line such that it winds evenly on the spool. A shaft having a spool end and a drive end is disposed through the centerline hole of the spool. A first quick-connector is disposed on the drive end of the shaft. A pair of clamp washers is disposed on the shaft to secure the spool. A first clamp washer of the pair of clamp washers is disposed on the spool end of the shaft adjacent an outside flange of the pair of flanges, and a second clamp washer of the pair of clamp washers is disposed on the shaft proximal the drive end and adjacent a drive side flange of the pair of flanges.

There is a drive housing having a base and a hollow vertical column. The base has a shape significantly conforming to the bottom of the bucket. The base can have a U-shaped cutout as needed to allow passage of the drain spout. A pair of pulleys is disposed on the base of the drive housing, wherein each of the pair of pulleys is configured to receive and redirect the fishing line. A drive is disposed within the hollow vertical column of the drive housing. The drive has a horizontal drive shaft, a differential, and a vertical drive shaft, wherein the horizontal drive shaft has a second quick-connector. The second quick connector is selectively engageable with the first quick-connector, and the vertical drive shaft is selectively engageable with a drill. The differential is configured to transfer power from the vertical drive shaft to the horizontal drive shaft, allowing a user to engage the drill with the vertical drive shaft to rotate the horizontal drive shaft, and ultimately the spool to wind and unwind the fishing line. A brake with a thumb screw is disposed on the spool to apply pressure on the spool while rewinding the fishing line.

Thus have been broadly outlined the more important features of the present fishing line rinse apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
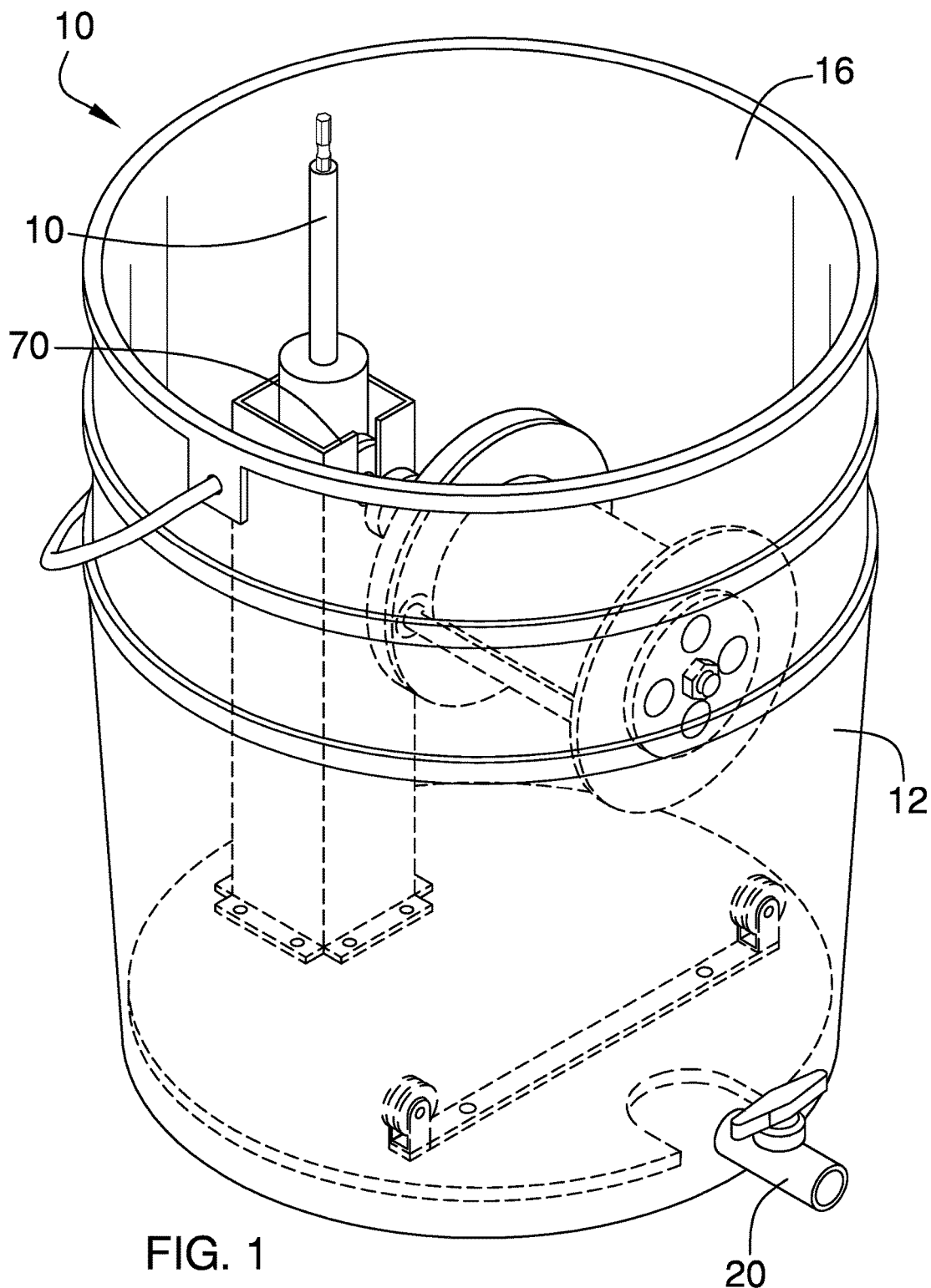
FIG. 1 is an isometric view of a fishing line rinse apparatus.
Figure 2:
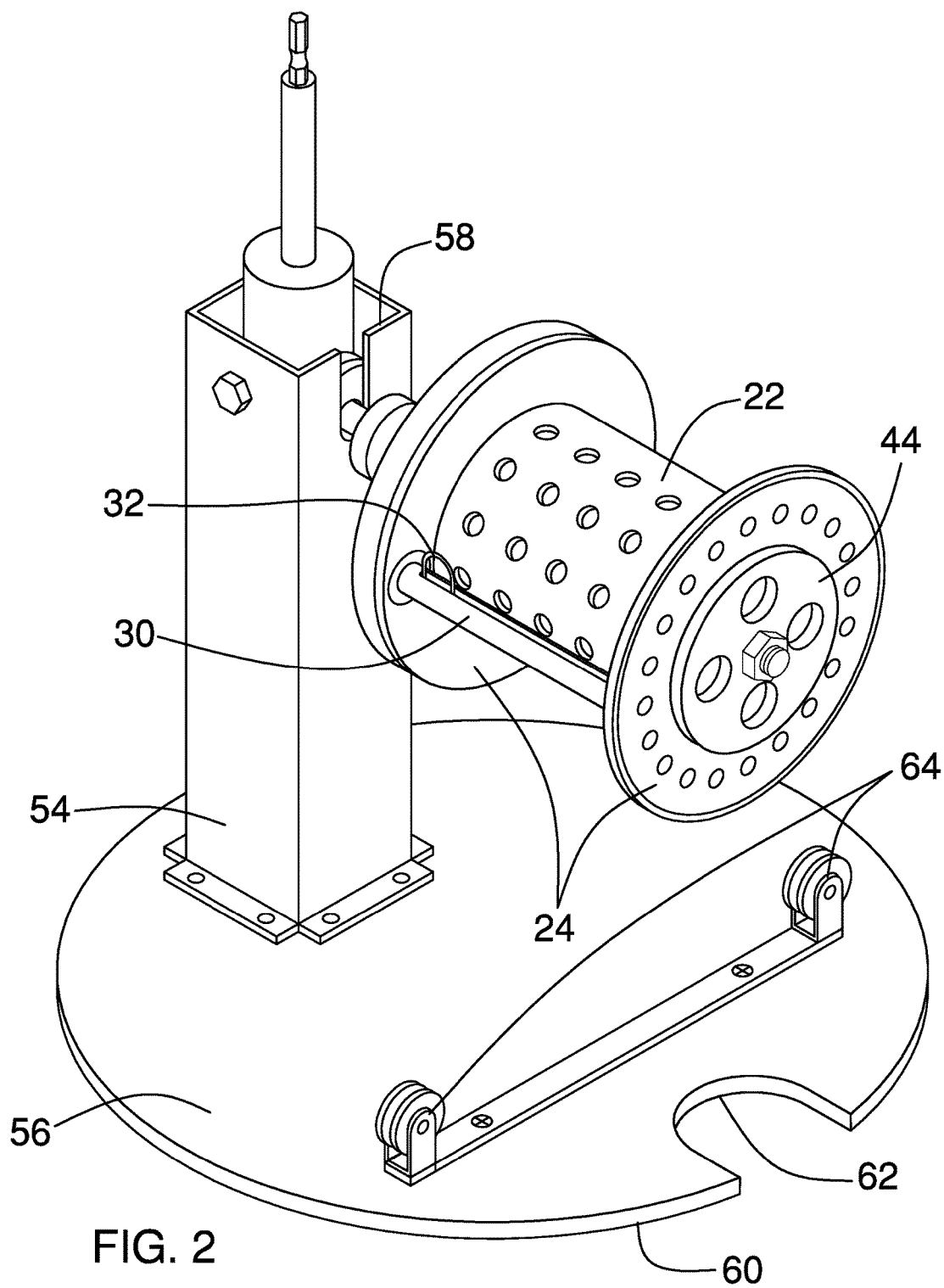
FIG. 2 is an isometric view of the fishing line rinse apparatus with the bucket.
Figure 3:
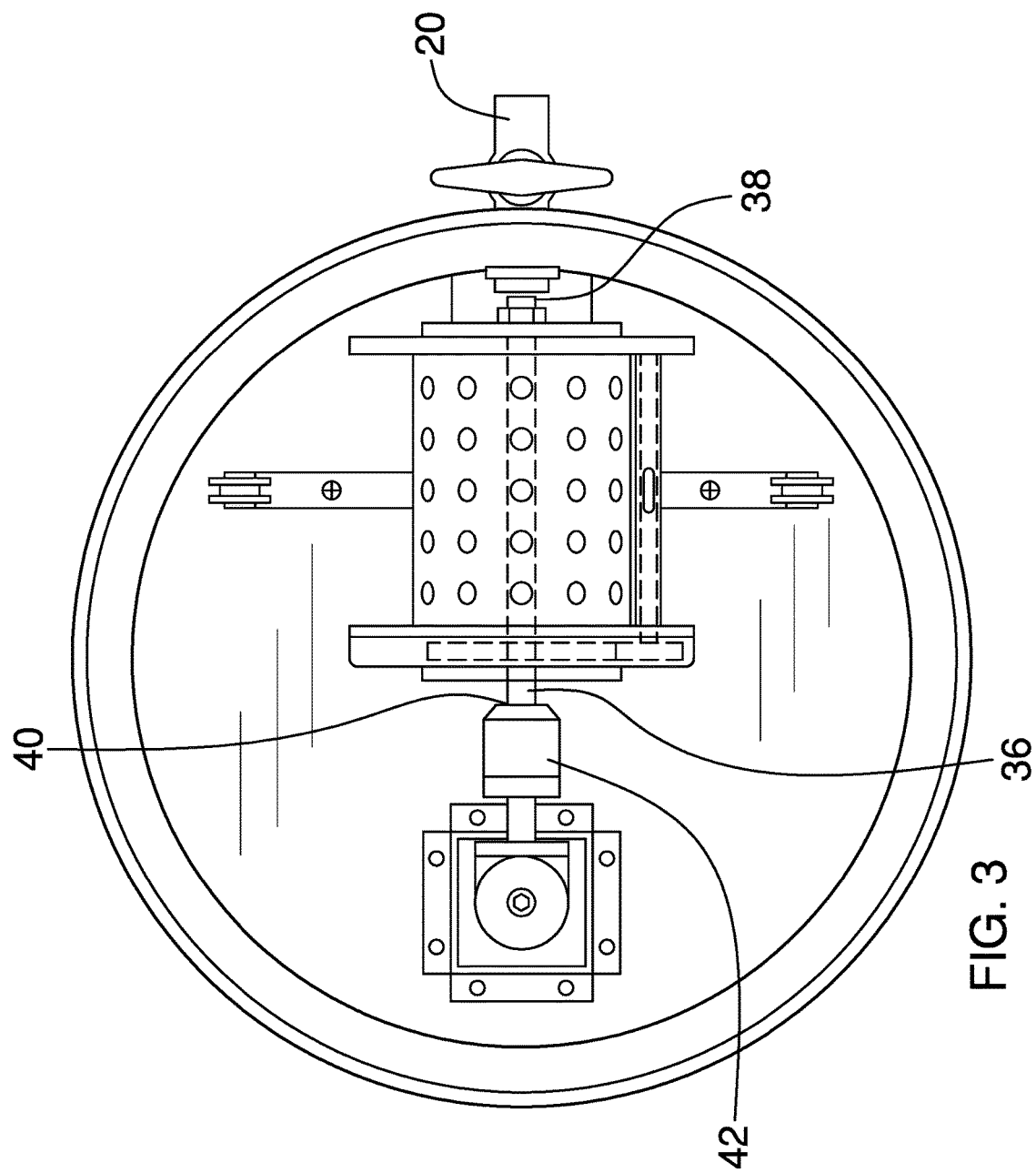
FIG. 3 is a top plan view of the fishing line rinse apparatus.
Figure 4:
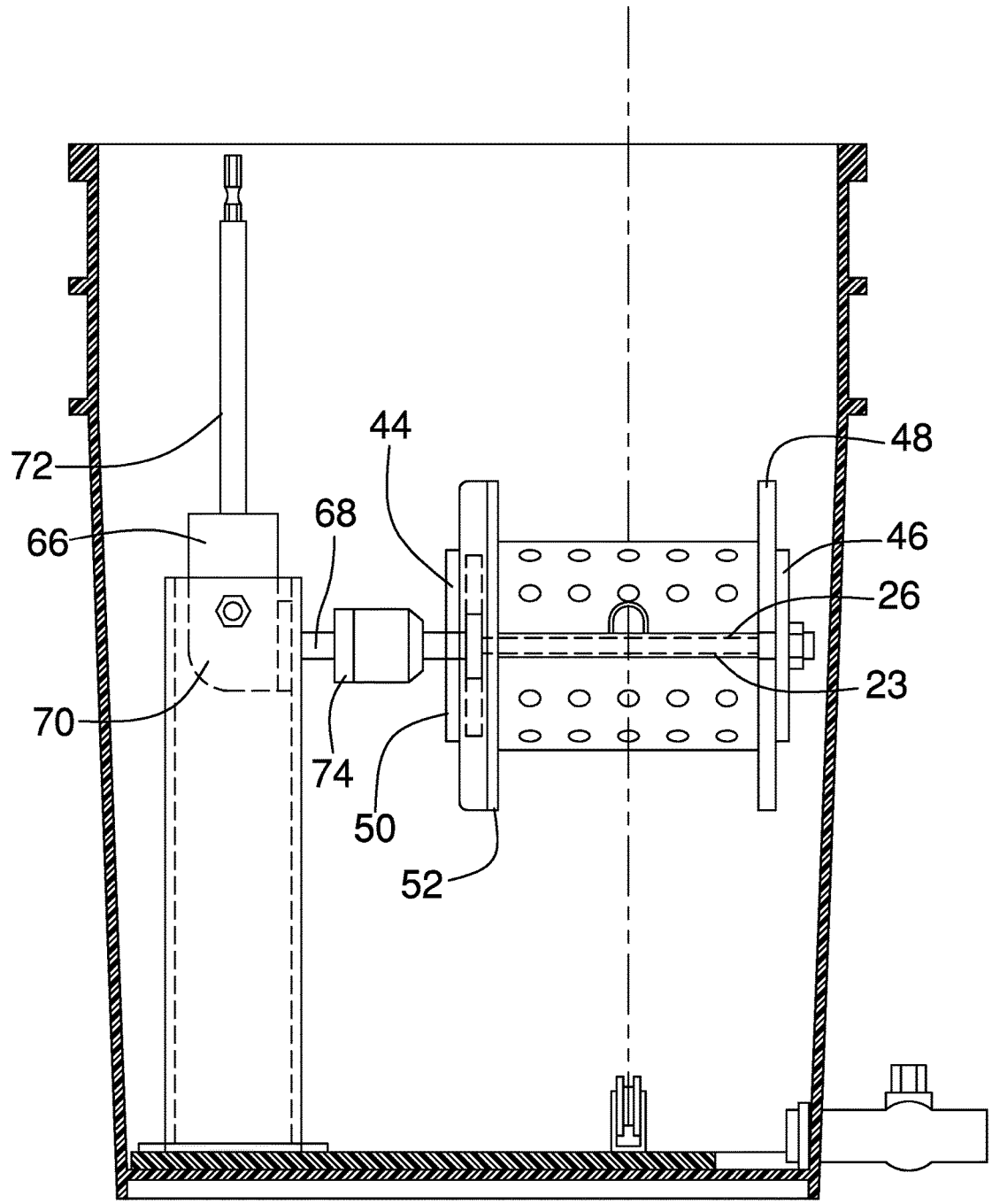
FIG. 4 is a cross-sectional view of the fishing line rinse apparatus.
Figure 5:
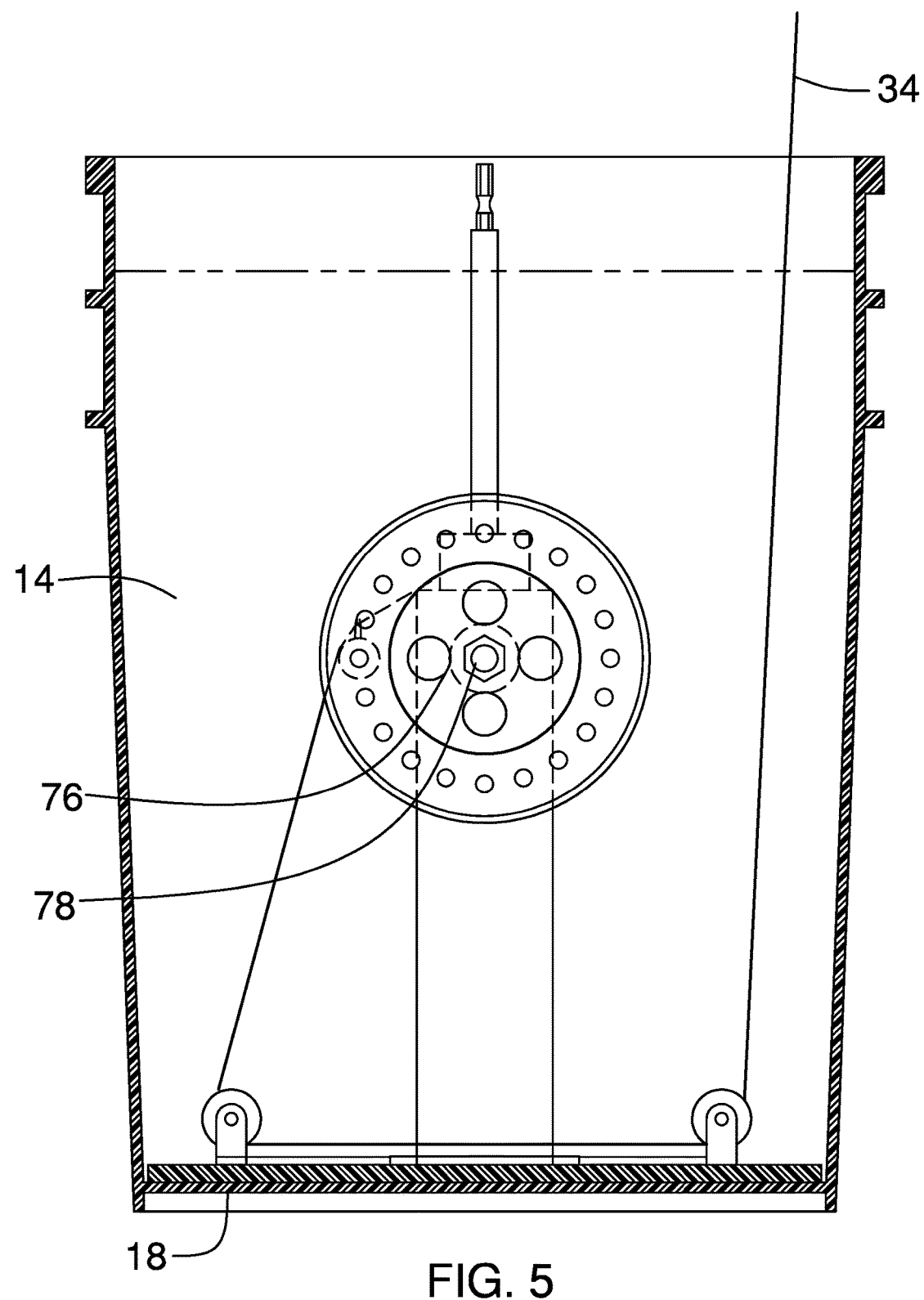
FIG. 5 is a cross-sectional view of the fishing line rinse apparatus.

With reference now to the drawings, and in particular FIGS. 1 through 5 thereof, an example of the instant fishing line rinse apparatus employing the principles and concepts of the present fishing line rinse apparatus and generally designated by the reference number 10 will be described.

Referring to FIGS. 1 through 5, the present fishing line rinse apparatus 10 is illustrated. The fishing line rinse apparatus 10 includes a bucket 12 having an inside 14, an open top 16, and a bottom 18. A drain spout 20 is disposed on the bucket 12 proximal the bottom 18. Disposed within the inside 14 of the bucket there is a spool 22 having a pair of flanges 24 and a centerline hole 26 disposed along a central axis 28. A level wind 30 is disposed on the spool 22 between the pair of flanges. The level wind has a slidable eyelet 32 that configured to receive a fishing line 34 and to slide back and forth along the spool 22 as it winds the fishing line. A shaft 36 having a spool end 38 and a drive end 40 is disposed through the centerline hole 26 of the spool. A first quick-connector 42 is disposed on the drive end 40 of the shaft. A pair of clamp washers 44 is disposed on the shaft 36 to secure the spool 22. A first clamp washer 46 of the pair of clamp washers is disposed on the spool end 38 of the shaft adjacent an outside flange 48 of the pair of flanges, and a second clamp washer 50 of the pair of clamp washers is disposed on the shaft proximal the drive end 40 and adjacent a drive side flange 52 of the pair of flanges.

There is a drive housing 54 having a base 56 and a hollow vertical column 58. The base has a shape 60 significantly conforming to the bottom 18 of the bucket. The base can have a U-shaped cutout 62 as needed to allow passage of the drain spout 20. A pair of pulleys 64 is disposed on the base 56 of the drive housing, wherein each of the pair of pulleys is configured to receive and redirect the fishing line 34. A drive 66 is disposed within the hollow vertical column 58 of the drive housing. The drive has a horizontal drive shaft 68, a differential 70, and a vertical drive shaft 72, wherein the horizontal drive shaft has a second quick-connector 74. The second quick connector is selectively engageable with the first quick-connector 42, and the vertical drive shaft is selectively engageable with a drill. A brake 76 with a thumb screw 78 is disposed on the spool 22 to apply pressure on the spool while rewinding the fishing line 34.

What is claimed is:

1. A fishing line rinse apparatus comprising:
   a bucket having an inside, an open top, and a bottom;
   a drain spout disposed on the bucket proximal the bottom;
   a spool having a pair of flanges and a centerline hole disposed along a central axis, wherein the spool is disposed within the inside of the bucket;
   a level wind disposed on the spool between the pair of flanges, wherein the level wind has a slidable eyelet, wherein the slidable eyelet is configured to receive a fishing line and to slide back and forth along the spool as it winds the fishing line;
   a shaft disposed through the centerline hole of the spool, wherein the shaft has a spool end and a drive end, wherein a first quick-connector is disposed on the drive end of the shaft;
   a pair of clamp washers, wherein a first clamp washer of the pair of clamp washers is disposed on the spool end of the shaft adjacent an outside flange of the pair of flanges, wherein a second clamp washer of the pair of clamp washers is disposed on the shaft proximal the drive end and adjacent a drive side flange of the pair of flanges;
   a drive housing having a base and a hollow vertical column;
   a pair of pulleys disposed on the base of the drive housing, wherein each of the pair of pulleys is configured to receive the fishing line;
   a drive disposed within the hollow vertical column of the drive housing having a horizontal drive shaft, a differential, and a vertical drive shaft, wherein the horizontal drive shaft has a second quick-connector, wherein said second quick connector is selectively engageable with the first quick-connector, wherein the vertical drive shaft is selectively engageable with a drill, wherein the differential is configured to transfer power from the vertical drive shaft to the horizontal drive shaft; and
   a brake disposed on the spool, wherein the brake has a thumb screw, wherein the thumb screw is configured to apply pressure on the spool while rewinding the fishing line.

2. The fishing line rinse apparatus of claim 1 wherein the spool is perforated.

\* \* \* \* \*